March 4, 1930.
A. A. THOMAS
ELECTROMAGNETIC TRANSLATING DEVICE
ELECTRIC PHONOGRAPH REPRODUCER
Re. 17,617
Original Filed Dec. 30, 1925
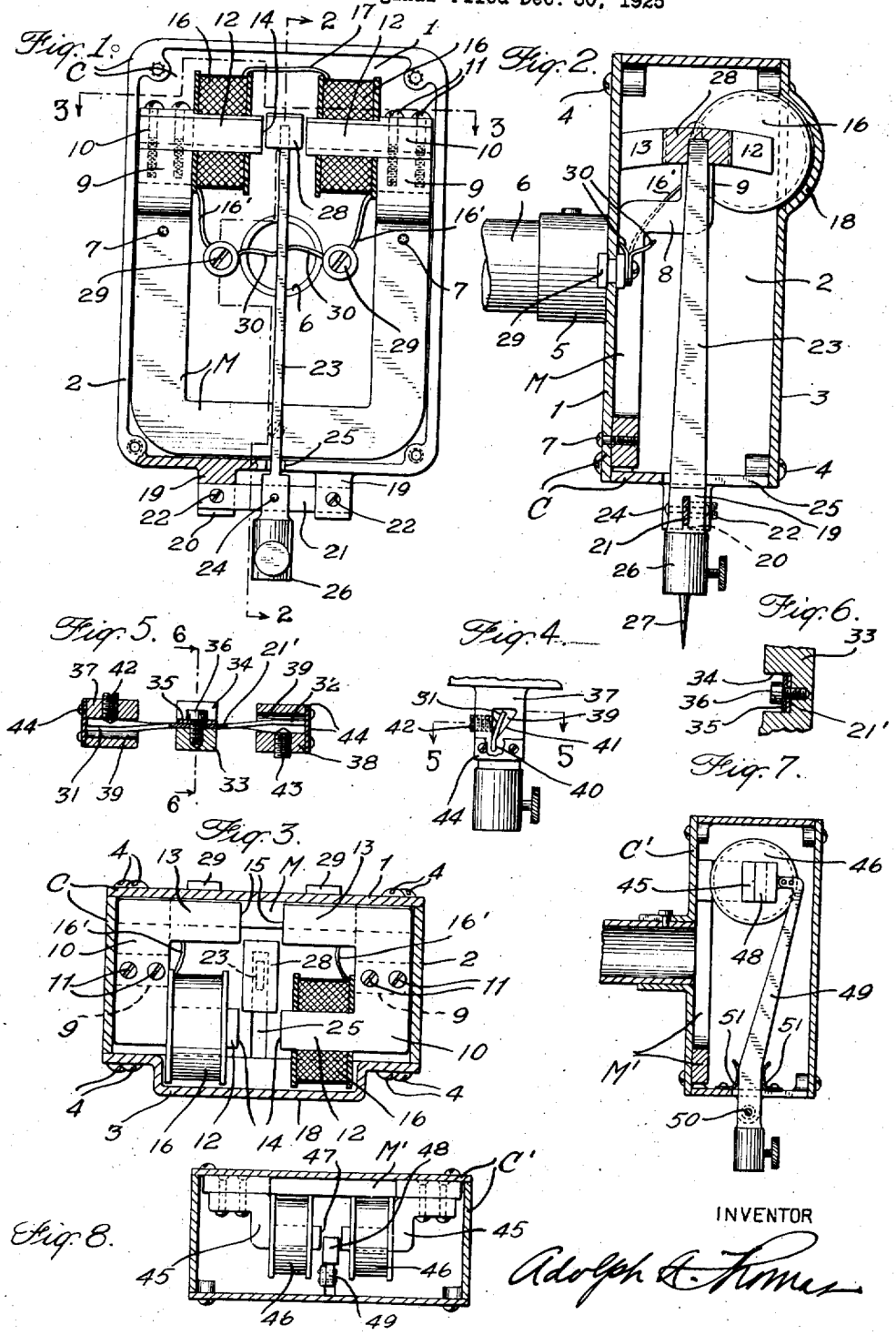
INVENTOR
Adolph A. Thomas Reissued Mar. 4, 1930 Re. 17,617

UNITED STATES PATENT OFFICE

ADOLPH A. THOMAS, OF NEW YORK, N. Y.

ELECTROMAGNETIC TRANSLATING DEVICE

Original No. 1,630,640, dated May 31, 1927, Serial No. 78,279, filed December 30, 1925. Application for reissue filed April 6, 1929. Serial No. 353,233.

My invention relates to sound-reproducing devices, and its object is to provide a new and improved sound reproducer particularly adapted for use in phonographs and similar apparatus.

The electric reproducer of my invention comprises a vibratory arm mechanically actuated at one end and carrying at its other end a magnetic member arranged to cooperate with electromagnetic mechanism to generate current impulses in accordance with the vibrations of the arm. When my invention is embodied as a phonograph reproducer, the vibratory arm is actuated at one end by a record needle, and the vibrations of the needle are transmitted to the magnetic member in amplified ratio. In the broader aspect of my invention, the vibratory arm may be mechanically actuated by any other acoustic means for electrically reproducing sound.

In a preferred embodiment of my invention, the reproducing arm is mounted on a spring, which performs the double function of supporting the arm and resiliently holding it in normal predetermined position. This spring, in its simplest form, is a flat blade held fast at its ends, and the arm is secured to the middle of the spring. The mounting of the spring is such that it is capable of a twisting or torsional movement to permit ready vibration of the arm laterally from its normal position in either direction. At the same time, the spring fully takes up the longitudinal thrust or strain exerted on the arm during its operation. This resilient mounting of the vibratory arm produces a construction of great simplicity, as it obviates the necessity of separate restoring or centralizing springs.

One of the marked advantages of my electric reproducer results from the extreme lightness and correspondingly low inertia of the vibratory unit, whereby the same responds freely and correctly to the mechanical actuations of the vibratory arms. Furthermore, the electromagnetic mechanism may be so constructed that the magnetic member on the arm exerts no appreciable magnetic drag or lag on the arm, thereby enhancing the degree of faithfulness of reproduction.

The instrument of my invention is of special advantage in reproducing from phonograph records having several hundred lines to the inch and playing for half an hour or more. In these records, the walls of adjacent grooves are necessarily frail, and the needle vibrations are of extreme delicacy. With such finely grooved records, an ordinary mechanical reproducer having a stiff diaphragm of essentially high inertia is out of the question. The same objection applies, at least to a large extent, to a microphonic reproducer in which a diaphragm operates against packed resistance granules. Now, in the reproducer of my invention, there is no diaphragm, the vibratory unit is very light and of low inertia, so that it responds instantly and faithfully to the needle vibrations. Since these vibrations are transmitted to the magnetic member in amplified ratio, the slightest movements of the needle cause current impulses to be generated by this member.

In the accompanying drawings I have illustrated several embodiments of my invention, which I shall now describe in detail, so that those skilled in the art may understand the same. I want to make it clear, however, that these constructions are merely practical examples and not limitations of my invention. In these drawings, Fig. 1 shows an interior face view, partly in section, of a phonograph reproducer constructed in accordance with my invention;

Fig. 2 represents a cross-section on the broken line 2—2 of Fig. 1;

Fig. 3 is a top plan view in section on the broken line 3—3 of Fig. 1;

Fig. 4 is a side view of a modified form of spring mounting for the needle arm;

Fig. 5 is a cross-section approximately on the broken line 5—5 of Fig. 4;

Fig. 6 is a cross-section on line 6—6 of Fig. 5;

Fig. 7 illustrates a side view, partly in section, of a modified form of reproducer embodying my invention; and Fig. 8 represents a plan view of the construction shown in Fig. 7.

Before going into a detailed description of these drawings, let me explain that the various parts have been purposely exaggerated in proportion and spacing, so as to make the drawings as clear as possible. The actual device would be considerably smaller than the illustrations.

I shall first describe the construction shown in Figs. 1, 2 and 3. The various parts of the instrument are mounted in a casing indicated as a whole by C, comprising a back plate 1, a body section 2, and a front plate or cover 3. These parts are preferably made separate and removably secured together by screws 4, or other fastening means. The casing parts may be constructed of light, non-magnetic material, such as aluminum, or an aluminum alloy, or they may be shaped out of bakelite or other suitable insulating composition. In the latter instance, the parts 1 and 2 could be molded as a single cup-shaped piece. The back plate 1 of the casing is provided with a hub 5 for mounting the instrument as a whole on a suitable arm 6. Since the particular embodiment I am describing is shown in the form of a phonograph reproducer, the arm 6 is supposed to be properly mounted to allow the reproducer to travel over a record.

Within the casing C is mounted a magnet M preferably of the permanent type. The magnet may be solid or composed of thin laminations. In the present instance, the magnet M is fixed to the back plate 1 by means of screws 7, but it may be supported in the casing in any other practical way. As seen from Fig. 1, the magnet is U-shaped and follows closely the outlines of the rectangular body section 2 of the casing, thus providing a magnetic path of maximum length in a small space. The legs of the magnet are bent forwardly, as indicated at 8, and then turned upwardly to form the polar ends 9. To each polar end is secured a U-shaped pole piece 10, as best shown in Fig. 3. These polar pieces are made preferably of soft iron, solid or laminated, and are firmly secured to the magnet by screws 11 or otherwise. Each pole piece 10 has a pair of limbs 12 and 13, which extend toward each other to form a pair of transversely aligned airgaps 14 and 15. On one or both polar limbs 12 is mounted a coil or coils 16. In the present instance, the coil 16 consists of two windings electrically connected, as indicated at 17, so as to form in effect a single coil. If the coil or coils 16 project beyond the width of the body section 2 of the casing, the front plate or cover 3 is formed with a bulge 18 to accommodate the coils, but the magnetic structure with its pole pieces and coils may be so designed that a comparative shallow casing will house all the parts. It will be noticed that the magnet M may be fully equipped with the pole pieces 10 and the coil or coils 16 before being inserted into the casing.

The central body section 2 of the casing is provided at its lower end with a pair of transversely aligned lugs 19, having each a slot 20 for receiving the ends of a spring blade 21, which is fixed in position by screws 22 or otherwise. At or near the center of the spring blade 21 is fixed a needle arm 23 in any practical way, as by means of a rivet 24. The arm 23 projects into the casing through a slot 25, and the lower end of the arm is formed as a needle holder 26 of any suitable construction adapted to hold a phonograph needle 27. The spring 21 is made of suitable spring metal and is so proportioned as to be capable of twisting or torsional movements at the center where the vibratory arm 23 is attached.

By looking at Fig. 2, it will be seen that when the needle of the reproducer rests on a record in playing position, the longitudinal thrust against the arm 23 is in the plane of the flat spring blade 21, and is therefore readily taken up by the spring. When the needle vibrates laterally (as viewed in Fig. 2), the leaf spring 21 is twisted sideways at the center and the needle arm 23 is allowed to vibrate back and forth in the casing. In other words, the leaf spring 21 not only supports the needle arm against longitudinal movement, but also constitutes a solid pivot bearing for the needle arm. Furthermore the spring support 21 normally holds the arm 23 in a neutral position, so that the arm is readily vibrated in opposite directions from its normal position. The part 21, therefore, performs a triple function and thus simplifies the construction.

On the free or inner end of needle arm 23 is mounted an armature 28, which is a soft iron piece of the proper dimensions, depending upon the shape and size of the magnetic airgaps 14 and 15. The armature 28 is preferably so dimensioned that it spans the airgaps 14 and 15 and is only of slightly less width than these airgaps. In Figs. 2 and 3, I have shown the armature 28 slightly overlapping the polar limbs 12 and 13 at its ends. The torsional spring support 21 normally holds the armature 28 in a practically neutral position midway between the airgaps 14 and 15. That is to say, the armature is normally balanced by the opposing magnetic pulls at its ends, so that the arm 23 is normally free from any strain or pull in the plane of its vibrations. This is easily understood from Fig. 3.

It will be clear that as the needle arm 23 vibrates back and forth, the magnetic flux passing through the coil or coils 16 is correspondingly varied. That is to say, when the armature moves toward the airgap 14, the greater portion of the field flux passes through the polar limbs 12 and the coil or coils 16. When the armature 26 moves into the airgap 15, the greater part of the field flux is shunted through the polar limbs 13, whereby the flux passing through the windings 16 is decreased. The amount of variation of the number of lines of force passing through the coil or coils 16 depends upon the amplitude of vibration of the armature 28, and the rate of magnetic variation depends upon the frequency of vibration of the armature. The variation of the magnetic flux through the current generating coils 16 is in amplified relation to the movements of the armature 28 for this reason: when the armature moves away from one pair of polar limbs, it simultaneously approaches the other polar limbs, so that the magnetic flux is suddenly shunted out of one pair of polar limbs into the other, and this sudden increased variation has an amplifying effect on the coil 16. Furthermore, since the armature 28 is at a considerably greater distance from the spring support 21 than is the point of the needle 27, the vibrations of the needle are transmitted to the armature in amplified ratio, so that the minutest vibrations of the needle produce movements of the armature sufficient to generate current impulses in the coil or coils mounted on the magnet. In order to maintain the vibrating armature 28 in complete alignment with the polar limbs 12 and 13, the upper and lower surfaces of the polar limbs and armature may be curved on the arc of a circle struck up from the axial center of the spring plate 21. This curvature of the polar limbs and armature is indicated in Fig. 2. This detail, however, is not necessary, since the armature vibrations are comparatively small.

The coil or coils 16 are connected in a circuit leading to suitable amplifying apparatus, which need not be shown or described, since it forms no part of my invention and is furthermore well understood by those skilled in the art. In Figs. 1 and 2, I have shown a pair of insulated binding posts 29, to which the ends 16′ of the windings 16 are connected. If the supporting arm 6 is tubular, the circuit connections 30 leading from the binding posts 29 may be concealed within this hollow arm, thereby imparting a neater appearance to the phonograph as a whole.

In Figs. 4, 5 and 6, I have shown a modified form of spring support for the vibratory needle arm. In this construction, the spring blade 21′ is given an initial torsional tension by slightly twisting the ends in opposite directions, as indicated at 31 and 32. This places the central section of the spring in a neutral or balanced condition, and to this balanced section of the spring is secured a needle arm 33 of proper shape and dimensions. A convenient way of attaching the needle arm to the spring is by providing the arm with a recess 34 in which the spring 21′ is tightly fitted. A plate 35 is then placed over the spring, and a screw or other fastening member 36 rigidly secures the parts together. The ends 31 and 32 of spring 21′ may be mounted in any suitable way to give them the desired degree of initial torsional tension. By way of example, I have shown a pair of lugs 37 and 38 projecting from the lower end of the casing, similar to the lugs 19 of Figs. 1 and 2. The lugs 37 and 38 are provided each with a slot 39 of a configuration as shown in Fig. 4. That is to say, each slot 39 has a lower narrow portion 40 and an enlarged portion formed by a slanting side 41. In the lugs 37 and 38 are mounted set-screws 42 and 43 arranged to project into the enlarged portions of the slots 39. The ends of spring 21′ fit tight into the narrow portions 40 of these slots. If desired, small end plates 44 may be secured to the lugs 37 and 38 across the narrow portions 40 of the slots, so as to positively lock the spring 21′ against accidental movement in a longitudinal direction. The set-screws 42 and 43 bear against the ends of the spring at or near the upper edge thereof, whereby these ends may be flexed laterally in the enlarged portions of the slots 39. This will be clearly understood from Fig. 4. The slots 39 are arranged oppositely in the lugs 37 and 38; in other words, the slanting sides 41 of the slots are positioned reversely with respect to the spring ends. By adjusting the screws 42 and 43, the initial lateral twist or turn given the spring ends may be regulated to the proper degree, so that the needle arm 33 is normally held balanced in predetermined position. The opposing torsional strains at the ends of spring 21′ permit ready vibrations of the needle arm laterally of the spring, as previously explained in reference to spring arm 23 of Figs. 1 and 2. The spring support of Figs. 4, 5 and 6 may be considered to be substituted in Figs. 1 and 2, but in the broader aspect of my invention, any practical electromagnetic reproducing mechanism may be associated with my novel construction of spring support for the needle arm.

In the modification of Figs. 7 and 8, there is a permanent U-shaped magnet M′ secured to the back wall of a casing C′ of proper construction and design. To the ends of magnet M′ are secured forwardly projecting pole pieces 45, usually made of soft iron, and one or both of these pole pieces carry a winding 46. If two windings 46 are used, as shown in Fig. 8, they are connected in series so as to constitute a single coil. When I speak of the coil 46, therefore, I mean either one or more windings. The pole pieces 45 are separated by an airgap 47, in which vibrates an armature 48 attached to the inner end of a needle arm 49. The armature 48 is a piece of soft iron of the proper dimensions, so as to fit closely in the airgap 47 without touching the pole pieces. The armature 48 is normally held in a position in which it projects part way into the airgap 47. Consequently, when the needle arm 49 vibrates in one direction the armature 48 moves farther into the airgap to increase the magnetic flux through the coil 46. During the reverse movement of the needle arm, the armature moves further out of the airgap and thereby decreases the magnetic flux through the winding. The needle arm 49 is mounted in any practical way on the casing C′. In the present instance, this arm is pivoted at 50 by a bearing at the lower side of the casing. It will be observed that the vibrations of the needle attached to arm 49 are transmitted in amplified ratio to the armature 48. Suitable spring means, such as a pair of leaf springs 51, hold the needle arm in normal position. In place of the pivot bearing 50 and the centering springs 51, the combined supporting and centralizing spring 21 or 21′ may be used.

Attention is called to the fact that the armatures 28 and 48 are so arranged in the magnetic airgaps that any tendency of the pole pieces to attract the armature laterally is at right angles to the plane of vibration of the needle arm. Consequently, any lateral magnetic drag that may develop by reason of the armature being slightly closer to one pole piece than to the other, exerts no drag or load (certainly to no disturbing extent) on the vibrations of the needle arm. Furthermore, any magnetic side pull on the armature (and therefore on the needle arm) is fully taken up by the mounting of the arm, particularly if the spring support 21 or 21′ is used.

Another practical advantage of my construction lies in the fact that the flux variations produced by the vibratory armature take place in the soft iron pole pieces and not in the steel body of the magnet. This increases the sensitiveness of the instrument, because soft iron has greater magnetic permeability than steel and offers little resistance to changes in magnetic flux.

It should be noted that the operative airgaps 14 and 15 of the magnet structure are narrower than the distance between the polar projections 12 and 13 of each pole piece. These narrow airgaps permit the passage of the normal field flux from one pair of polar projections to the other with a minimum amount of magnetic leakage, thereby adding to the efficiency of the instrument. Some of the field flux will, of course, pass through the extreme ends of the armature structure 28, but the flux never passes lengthwise through the armature to saturate the same. The armature therefore responds instantly and accurately to electric impulses in the coils 16 when the instrument is used as a receiver. As previously stated, the vibratory unit is of low inertia, which means that the armature is made comparatively light. To avoid any possibility of misinterpretation or confusion as to what I mean by the width of the airgaps 14 and 15, I wish to make it clear that I refer to the distance between the opposed polar faces which form the airgaps, and I do not refer to the length or width of the polar projections, which may have such dimensions as may be found most suitable in any particular design of instrument.

It will be seen from the foregoing description that I have provided an electric sound reproducer of exceedingly simple construction and capable of faithfully reproducing the most delicate vibrations of a phonograph needle or performing any other useful function. Of course, it is assumed that the parts are properly designed, proportioned and assembled. No rule can be laid down as to the precise dimensions of the parts, for these are matters of experiment well within the skill of the artisan trained in this particular line of science.

In the broader aspect of my invention, the vibratory arm or lever which carries the armature may be mechanically actuated at its outer end by other means than a phonograph needle. It is possible, for example, to connect a transmitting diaphragm with or to the outer end of the needle arm, and if this diaphragm is actuated by sound waves, the armature 28 or 48 is vibrated to generate current impulses in the associated coil for acoustically reproducing the sound waves which set the transmitting diaphragm in motion. In this way, my new instrument may be used as a telephone transmitter capable of use in broadcasting and similar field of utility. Also, it is manifest that electric impulses passing through the coils 16 or 46 cause vibration of the armature structure to operate any suitable member or mechanism.

Although I have shown and described certain specific constructions, it is apparent that the various features of my invention may be mechanically embodied in other forms without departing from the scope of the following claims.

When I refer to my invention as a phonograph reproducer, I use the word "phonograph" in its broadest possible sense of "recorded sound." The particular type or name of sound-reproducing machine in which my invention is embodied, is immaterial.

What I claim as my invention is:

1. In an electric phonograph reproducer free from an acoustic diaphragm, a vibratory lever adapted to be actuated by the vibrations of a record needle, said lever comprising a short arm and a long arm, a permanent magnet having pole pieces, a magnetic member mounted on the free end of said long arm in operative relation to said pole pieces, whereby the needle vibrations are transmitted in amplified ratio to said member, non-acoustic resilient means for holding said needle arm and magnetic member in predetermined normal position, and a current generating coil controlled by the movement of said member.

2. An electric phonograph reproducer comprising a casing, a substantially U-shaped magnet mounted in said casing with its legs extending upwardly so that the pole pieces terminate near the upper end of the casing, a needle arm pivoted to the lower end of said casing, the pivot point of said needle arm being arranged that the needle vibrations are transmitted to the inner end of the arm in amplified ratio, an armature mounted on the inner end of said needle arm to vary the magnetic flux through said pole pieces, and a coil on one of said pole pieces.

3. In an electromagnetic translating device a magnet provided with two pairs of oppositely arranged pole pieces forming a pair of aligned airgaps, said pole pieces and airgaps constituting two parallel paths for the magnetic flux, a pivoted lever adapted to be actuated at one end, an armature mounted on the other end of said lever and arranged to reciprocate between said airgaps, so that one end of said armature moves toward one of the airgaps while the other end moves away from the other airgap, whereby the magnetic flux is increased through one of said parallel paths and simultaneously decreased through the other path, and a coil effected by flux variations through said paths.

4. In an electric phonograph reproducer, a casing, a magnet secured to a wall of said casing, said magnet consisting of a substantially U-shaped body lying flat against said wall and having a pair of polar projections extending away from said wall, said magnet being so mounted that the legs thereof extend upwardly so that the polar projections are near the upper part of said casing, said pole projections being arranged to provide an airgap, a coil on at least one of said polar projections, a needle arm pivoted to the lower part of said casing and extending upwardly toward said polar projections, an armature mounted on the inner end of said arm to vibrate in said airgap in amplified relation to the needle vibrations, and non-acoustic resilient means for holding said needle arm and armature in predetermined normal position.

5. An electric phonograph reproducer comprising a casing, a needle arm pivoted to the lower portion of said casing so as to vibrate transversely thereof, an armature mounted on the free inner end of said arm which terminates near the upper portion of said casing, so that the needle vibrations are transmitted in amplified ratio to said armature, the vibrations of said armature being in a plane at right angles to the plane of said casing, and electromagnetic mechanism mounted within said casing for generating currents in accordance with the amplified vibrations of said armature.

6. An electric phonograph reproducer comprising a shallow casing having substantially parallel front and rear walls, a magnet mounted in said casing against one of said walls and having an airgap near the upper portion of said casing, a needle arm pivoted to the lower portion of said casing so as to vibrate transversely thereof between said walls, a magnetic member mounted on the inner end of said arm to vary the flux across said airgap, and a current-generating coil controlled by the vibrations of said magnetic member.

7. In an electric phonograph reproducer, a casing provided at its lower end with a pivoted needle-holder, a vibratory arm arranged within said casing and connected at its lower end with said needle-holder, a magnet so mounted in said casing that the magnetic airgap is near the uper end of the casing diametrically opposite said needle-holder, a coil associated with said magnet, and a magnetic member mounted on the free end of said arm to vibrate in operative relation to said airgap, the length of said arm being such that the needle vibrations are transmitted to said magnetic member in amplified ratio to generate variable currents in the circuit of said coil.

8. An electric phonograph reproducer comprising a shallow casing having substantially parallel front and rear walls, a magnet mounted in said casing against one of said walls and having polar faces arranged to form a pair of aligned airgaps extending transversely of said casing in a direction at right angles to the walls thereof, a needle arm pivoted to said casing so as to vibrate in a plane perpendicular to said walls, an armature connected to the free end of said needle arm and arranged to vibrate between said airgaps transversely of the casing in a path substantially parallel with said polar faces, and a coil controlled by said armature.

9. In an electromagnetic translating device, a magnet having a pair of U-shaped pole pieces arranged to provide a pair of aligned airgaps, a coil surrounding the limb of one of said pole pieces, a pivoted lever comprising a short arm and a long arm, acoustic means for mechanically vibrating said short arm, and an armature attached to the free end of said long arm to vibrate between said airgaps in amplified relation to the movements of the short arm.

10. An electric phonograph reproducer comprising a casing, a magnet mounted in said casing and having a pair of U-shaped pole pieces arranged to provide a pair of airgaps near the upper portion of the casing, said airgaps extending in axial alignment transversely of said casing, a needle arm pivoted to the lower portion of said casing in such position that the longer section of the needle arm extends toward said pole pieces in a direction midway of said airgaps, said needle arm vibrating transversely of said casing, an armature mounted on the free inner end of the needle arm to vibrate between said airgaps and thereby vary the magnetic flux through said coil, the needle vibrations of said arm being transmitted in amplified ratio to said armature, and means for normally holding said armature substantially midway of said airgaps.

11. In an electromagnetic translating device, a magnet having bifurcated pole pieces arranged to provide at least two aligned operative airgaps formed between pairs of polar faces of opposite polarity, the distance between each pair of said opposite polar faces being less than the distance between the bifurcations of said pole pieces to provide relatively narrow airgaps across which the flux of said magnet passes in parallel paths, an armature structure arranged to vibrate between said airgaps in a direction substantially parallel with said polar faces and at right angles to the passage of flux across said airgaps, so that the vibrations of said armature structure increase the magnetic field flux through one of said parallel paths and simultaneously decrease the flux through the other path, resilient means for guiding said armature structure across the said opposing polar faces with constant clearance, at least one coil mounted on said bifurcated pole pieces, and an operative member connected to said armature structure.

12. In an electric phonograph reproducer, a magnet having pole pieces arranged to provide a pair of parallel magnetic paths with aligned airgaps, a vibratory needle arm carrying an armature arranged to vibrate between said airgaps in a direction at right angles to the passage of flux across said airgaps, so that the vibrations of said armature increase the magnetic field flux through one of said parallel paths and simultaneously decrease the flux through the other path, and a coil mounted on one of said pole pieces.

13. In an electromagnetic translating device, a magnet having a pair of U-shaped pole pieces arranged to provide a pair of aligned airgaps, a coil surrounding the limb of one of said pole pieces, a vibratory lever comprising a short arm and a long arm, a torsional resilient spring blade for pivotally supporting said lever, acoustic means for mechanically vibrating said short arm, and an armature attached to the free end of said long arm to vibrate between said airgaps in amplified relation to the movements of the short arm, said supporting spring normally holding said armature substantially midway of said airgaps.

14. In a phonograph reproducer, a single flat spring blade supported solely at its ends and laterally twistable between said ends, means for placing said spring blade under normal tension, and a needle arm secured to and supported by said blade which also forms a solid pivot bearing for said arm.

15. In a phonograph reproducer, a single flat torsional spring blade supported solely at its ends so as to lie in a plane practically at right angles to the plane of a playing record, a needle arm attached to and supported by said spring, and means for placing said spring under initial torsional strain by laterally displacing the ends thereof in opposite directions to hold said arm resiliently in normal predetermined position.

16. A phonograph reproducer having a single flat spring blade supported solely at its ends and capable of lateral twisting movements in opposite directions at its central portion, a needle arm attached to said blade at or near the center thereof, so that said blade not only supports said arm against longitudinal movement but also constitutes the sole pivot bearing for the lateral vibrations of said arm, and a reproducing element operated by said arm.

17. In a phonograph reproducer, a single flat torsional spring blade supported solely at its ends so as to lie in a plane practially at right angles to the plane of a playing record, and a needle arm attached to said spring and supported solely thereby, said spring blade also constituting the sole bearing for the pivotal movements of said arm.

18. In a phonograph reproducer, a single flat twistable spring blade supported solely at its ends in bearings, means for adjusting said bearings laterally of said spring blade in opposite directions to place the same under initial torsional strain, and a needle arm secured to the center of said blade and supported thereby against longitudinal movement, said blade also forming a pivotal bearing for said arm.

19. An electromagnetic translating device comprising a permanent magnet structure provided with polar projections having end faces of opposite polarity arranged to provide at least a pair of aligned operative airgaps through which the normal field flux passes in parallel paths, the width of said airgaps being less than the distance between polar projections of like polarity, a vibratory member, an armature structure connected to said member and arranged to reciprocate between said airgaps so that the magnetic reluctance across one airgap is decreased and the magnetic reluctance across the other airgap is simultaneously increased, said armature structure being mounted to vibrate in a path substantially parallel with said polar faces, and a coil operatively associated with said magnet to cause vibration of said armature structure and member or to generate current impulses in accordance with the vibrations of said structure and member.

20. A phonograph reproducer comprising a casing mounted to travel over a record, a single flat spring blade fixed at its ends to said casing and arranged in a plane substantially at right angles to the axis of said casing, whereby said blade is positioned approximately edgewise with respect to a playing record, a needle arm attached to the middle of said blade and extending in substantially the plane thereof, so that the longitudinal thrust of said arm is practically in or along the plane of said blade, which thus acts as a firm pivot for said arm and yet permits vibration thereof, and reproducing mechanism operated by said arm.

21. In a phonograph reproducer, a single flat spring blade supported solely at its ends and laterally twistable between said ends, means for supporting the ends of said blade in reversely inclined positions, whereby said blade is normally tensioned, said supporting means including adjustable screws which act like positive stops to counter-act the pressure or thrust of the tensioned spring blade in a direction substantially at right angles to the screw-threads, and a stylus holder connected to the center of said blade.

22. In an electromagnetic reproducer, a single flat spring blade laterally twistable and supported solely at its ends for vibratory movement, an armature connected to said spring blade, a magnet system operatively associated with said armature, and means for adjusting said spring blade to vary the normal position of said armature, said adjusting means including adjustable screws which act like positive stops to counter-act the pressure or thrust of the tensioned spring blade in a direction substantially at right angles to the screw-threads.

23. In an electromagnetic reproducer, a support comprising a pair of reversely inclined members, a resilient strip supported in tensioned condition between said members for vibratory movement, an armature carried by said strip, and a magnetic system operatively associated with said armature, said support including adjustable screws to adjust the normal position of said armature.

24. In an electric translating device, a pair of supports having oppositely inclined portions, a laterally twistable spring blade mounted at its ends in said inclined portions, whereby said blade is normally tensioned, a vibratory member connected with the center of said blade, and means for converting the movements of said member into electric impulses.

25. In an electromagnetic translating device, a magnet system having an armature, a resilient vibratory strip supporting said armature, and a pair of spaced supports for the ends of said strip, said supports having oppositely inclined portions over which the strip is bent to place it under normal tension.

26. In an electromagnetic translating device, a magnet system having an armature, a resilient vibratory strip supporting said armature, and a pair of spaced supports for the ends of said strip, said supports having oppositely inclined portions over which the strip is bent to place it under normal tension, said supports including adjustable screws to regulate the normal position of said armature.

27. In an electromagnetic translating device, a laterally twistable spring blade supported at its ends, an armature supported by said spring blade for vibratory movement, a magnet system operatively associated with said armature, and means for tilting the plane of said spring blade to adjust the normal position of said armature, said means including adjustable screws which act like positive stops to counter-act the pressure or thrust of the tensioned spring blade in a direction substantially at right angles to the screw-threads.

28. In an electromagnetic translating device, a laterally twistable spring blade, supports for the ends of said spring blade, a vibratory armature connected to said spring blade, a magnet system operatively associated with said armature, and means for adjusting said supports laterally to regulate the normal position of the spring blade and armature, said adjusting means including adjustable screws which act like positive stops to counter-act the pressure or thrust of the tensioned spring blade in a direction substantially at right angles to the screw-threads.

29. In an electromagnetic translating device, a magnet provided with pole pieces arranged to form two airgaps, a laterally twistable spring blade supported at its ends, an armature connected to the central portion of said spring blade and having its ends in operative relation to said airgaps, and screws for adjusting said spring blade to regulate the normal position of said armature in said airgaps, said screws acting like positive stops to counter-act the pressure or thrust of the tensioned spring blade in a direction substantially at right angles to the screw-threads.

30. In an electromagnetic device, a permanent magnet, an armature arranged for vibration between the pole pieces of said magnet, and means to position said armature with reference to the pole pieces, said means comprising a spring member having adjustable end portions and screws which cooperate with said end portions to adjust the same and thereby cause said armature to rock into the desired position, said screws acting like positive stops to counter-act the pressure or thrust of the tensioned spring blade in a direction substantially at right angles to the screw-threads.

31. In an electromagnetic device, a vibrating armature, a flat spring connected at the center to said armature and having bent end portions, supports for the end portions of said spring, and adjustable screw members which bear against the end portions of the spring to flex them and hold them firmly fixed in said supports.

32. An electromagnetic translating device comprising a permanent magnet structure having pole pieces with polar projections arranged to provide at least one pair of aligned airgaps formed each between two polar faces of opposite polarity, said pole pieces and airgaps constituting parallel paths for the magnetic flux, the width of each airgap being less than the distance between polar projections of the same polarity, an armature structure mounted to vibrate between said airgaps, so that one end of the armature structure moves toward one of said airgaps while the other end moves away from the other airgap in a direction substantially parallel with the polar faces of said pole pieces, and a pair of coils mounted on the magnet pole pieces in operative relation to said armature structure, the magnetic flux being increased through one of said parallel paths and simultaneously decreased through the other path.

33. An electromagnetic translating device comprising a permanent magnet structure having bifurcated pole pieces spaced to provide parallel magnetic paths with aligned airgaps, said airgaps being formed between polar faces of opposite polarity and being narrower than the distance between the bifurcations of each pole piece, an armature structure arranged to vibrate between said airgaps in a direction substantially parallel with said polar faces and at right angles to the passage of magnetic flux across said airgaps, and a pair of coils mounted on said pole pieces in operative relation to said armature structure, the relation of said pole pieces and armature structure being such that the magnetic flux is increased through one of said paths and one end of said armature structure and is simultaneously decreased through the other path and the other end of said armature structure.

34. In an electromagnetic translating device, an electromagnetic unit comprising a permanent magnet structure having pole pieces with projections spaced to provide parallel magnetic paths with aligned airgaps, said airgaps being formed between polar faces of opposite polarity and being narrower than the distance between polar projections of the same polarity, an armature structure arranged to vibrate between said airgaps in a direction substantially parallel with said polar faces and at right angles to the passage of magnetic flux across said airgaps, spring means for supporting said armature structure for vibratory movement in said airgaps, said armature structure being normally balanced magnetically by the flux across said airgaps acting in opposite directions on the opposite ends of said structure, the mounting of said vibratory armature structure being such that the gaps between the armature ends and adjacent pole faces remain substantially constant during the vibration of said structure, while the overlapping areas between the armature ends and pole faces vary, and a pair of coils in operative relation to said armature structure.

ADOLPH A. THOMAS.